United States Patent [19]

Nozawa et al.

[11] Patent Number: 4,502,108
[45] Date of Patent: Feb. 26, 1985

[54] POSITION ERROR CORRECTION EQUIPMENT

[75] Inventors: Ryoichiro Nozawa, Shibuya; Tsuyoshi Nagamine, Hachioji; Hideaki Kawamura, Hachioji; Mitsuto Miyata, Hachioji, all of Japan

[73] Assignee: Fujitsu Fanuc Limited, Minamitsuru, Japan

[21] Appl. No.: 395,005

[22] PCT Filed: Oct. 28, 1981

[86] PCT No.: PCT/JP81/00308
§ 371 Date: Jun. 29, 1982
§ 102(e) Date: Jun. 29, 1982

[87] PCT Pub. No.: WO82/01601
PCT Pub. Date: May 13, 1982

[30] Foreign Application Priority Data

Oct. 30, 1980 [JP] Japan .................................. 55-152874

[51] Int. Cl.³ ........................ G06F 15/46; G05B 19/18
[52] U.S. Cl. ..................................... 364/170; 318/630; 318/632; 364/175; 364/474
[58] Field of Search .................. 364/167–171, 364/174, 175, 474, 475; 318/611, 630, 632, 633, 634

[56] References Cited

U.S. PATENT DOCUMENTS

| 3,555,254 | 1/1971 | Gerber | 318/632 |
| 3,705,400 | 12/1972 | Cordes, Jr. | 318/632 X |
| 3,794,902 | 2/1974 | Nishimura et al. | 318/632 X |
| 3,852,719 | 12/1974 | Nishimura et al. | 318/632 X |
| 4,099,113 | 7/1978 | Hayashi | 318/632 |
| 4,251,761 | 2/1981 | Inoue | 318/632 X |

Primary Examiner—Joseph F. Ruggiero
Attorney, Agent, or Firm—Staas & Halsey

[57] ABSTRACT

Position error correction equipment with which it is possible to perform a backlash correction or a pitch error correction with a high degree of accuracy even if the state of a numerical control machine tool, for instance, temperature, varies. Error correction data groups predetermined by measurement in respective states of the numerical control machine tool are stored in an error storage circuit (MEM) corresponding to the respective states. An error correction data selecting circuit (MPX) selects an error correction data group corresponding to a particular state of the numerical machine tool from the error correction data groups stored in the error storage circuit (MEM). A position correcting circuit (CPG) carries out a position correction by adding a correction pulse to a command pulse or feedback pulse from a position detector through utilization of the error correction data group selected by the error correction data selecting circuit (MPX).

4 Claims, 6 Drawing Figures

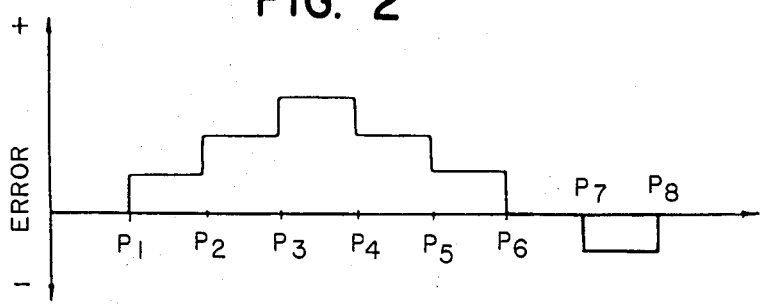
FIG. 2
FIG. 3
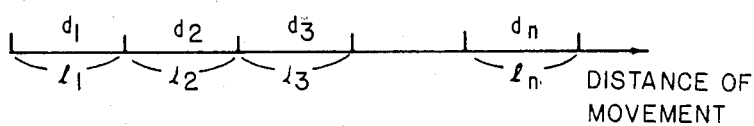
FIG. 4
FIG. 5
FIG. 6

POSITION ERROR CORRECTION EQUIPMENT

BACKGROUND OF THE INVENTION

The present invention relates to an improvement of position error correction equipment which corrects an error in the position of movement relative to a commanded position in a numerical control machine tool through using error correction data prestored in an error storage circuit.

In a numerical control machine tool in which commanded position information is compared with detected position information from a position detector mounted on a servomotor shaft or ball screw for moving a movable machine part and in which position control is carried out by driving a servomotor, so that an error between the commanded and detected position information may be reduced to zero, the position control accuracy is dependent substantially on the accuracy of the ball screw and other gear mechanisms. When requiring highly accurate position control, there have heretofore been adopted various position error correcting methods, such as a backlash correction, pitch error correction or the like in a mechanical system; in the past, however, since the correction has been effected based on only fixed error correction data, that is, correction data predetermined for one state of the machine tool, for example, a constant temperature of a ball screw and a constant weight of a movable part, accurate correction has not always been carried out. The reason is that, for instance, a pitch error of the ball screw may sometimes undergo a large variation due to a temperature change or the like of the ball screw, and the quantity of backlash in the mechanical system may greatly change with the change in the weight of different workpieces.

SUMMARY OF THE INVENTION

The present invention has for an object to permit more accurate position error correction by preparing error correction data corresponding to respective states of a numerical control machine tool and selectively using the error correction data in accordance with a particular state of the numerical control machine tool.

To achieve this object, the present invention is provided with an error storage circuit in which error correction data groups predetermined by measurement in respective states of the numerical control machine tool are stored corresponding to the respective states, an error correction data selecting circuit for selecting an error correction data group corresponding to a particular state of the numerical control machine tool from the error correction data groups stored in the error storage circuit, and a position correcting circuit for correcting an error in the position by adding a correction pulse to a command pulse or feedback pulse from a position detector through utilization of the error correction data group selected by the error correction data selecting circuit.

BRIEF DESCRIPTION OF THE DRAWINGS

FIG. 2 is a schematic diagram of an example of a pitch error characteristic;

FIG. 3 is a diagram of the contents of pitch error correction data groups;

FIG. 4 is a diagram showing variations in the quantity of backlash in the direction of movement; and FIGS. 5 and 6 are diagrams of the contents of backlash error correction data groups.

DESCRIPTION OF THE PREFERRED EMBODIMENTS

Figure 1:
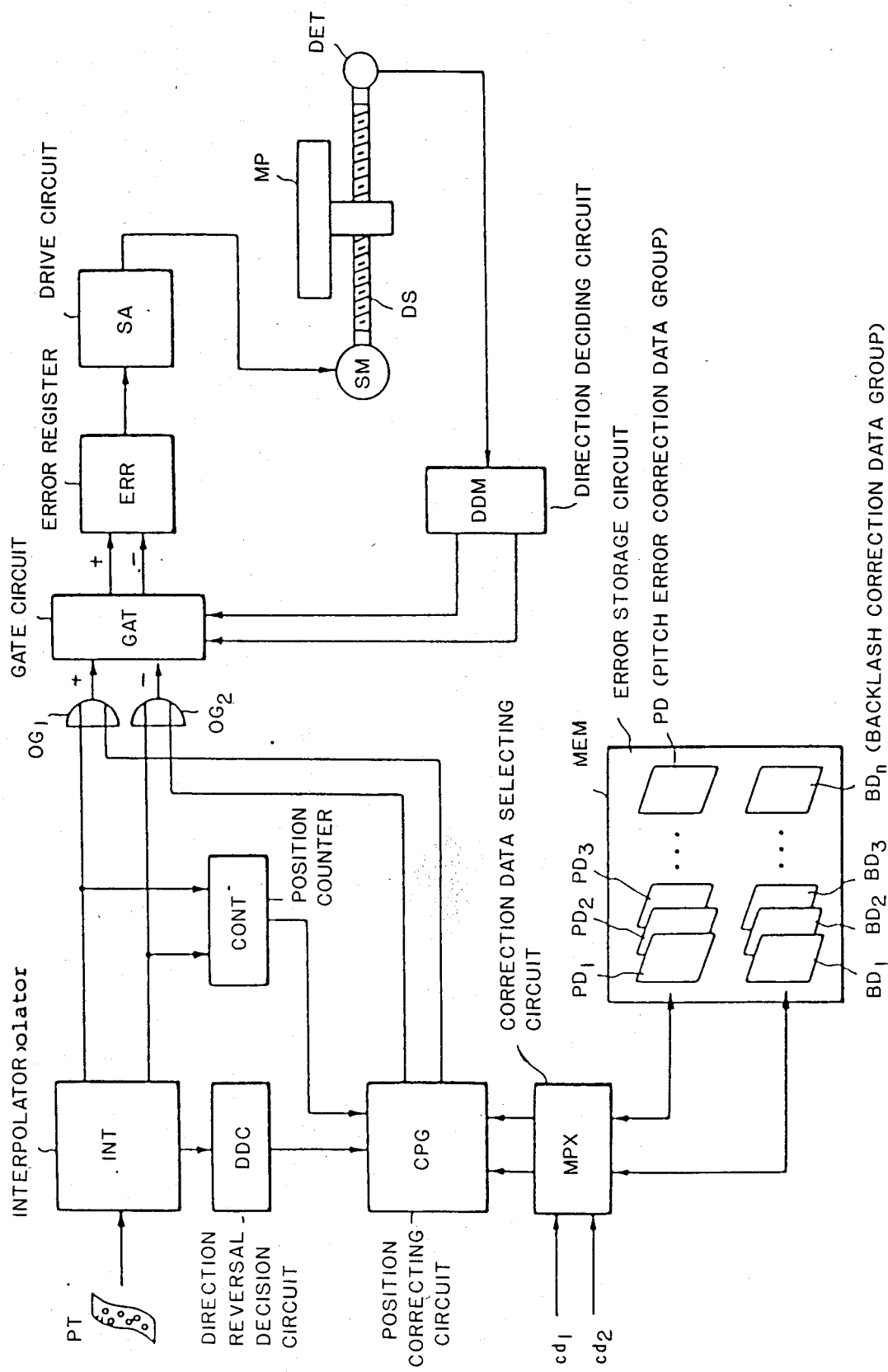
FIG. 1 is a block diagram of the equipment of the present invention.

FIG. 1 is a block diagram illustrating the principal part of an embodiment of the device of the present invention. Reference character MEM indicates an error storage circuit, $PD_1$ to $PD_n$ pitch error correction data groups, $BD_1$ to $BD_n$ backlash correction data groups, MPX a correction data selecting circuit, $cd_1$ and $cd_2$ status signals indicating the status of a numerical control machine tool, CPG a position correcting circuit, PT a command tape, DDC a direction reversal decision circuit, CONT a position counter, INT an interpolator, $OG_1$ and $OG_2$ OR gates, GAT a gate circuit, ERR an error register, SA a drive circuit, SM a servomotor, DS a ball screw, MP a movable machine part, DET a detector, such as a position coder or the like, and DDM a direction deciding circuit.

The pitch error correction data groups $PD_1$ to $PD_n$ stored in the error storage circuit MEM are groups of correction data predetermined by measurement at the states in which the temperature of the ball screw DS, for instance, was in the ranges of $t_0$ to $t_1$, $t_1$ to $t_2$, ..., $t_{n-1}$ to $t_n$, respectively. For example, in the case where errors at positions $P_1$ to $P_8$ spaced from the origin are as shown in FIG. 2, each data group is, for example, as shown in FIG. 3 in which correction pulses or a correction valve are stored corresponding to the respective positions. The backlash correction data groups $BD_1$ to $BD_n$ are those obtained by measurement in the states in which the weight of a workpiece was in the ranges of $w_0$ to $w_1$, $w_1$ to $w_2$, ..., $w_{n-1}$ to $w_n$, respectively. For example, in the case where the amounts of backlash in sections of movement $l_1$ to $l_n$ are $d_1$ to $d_n$, respectively, as shown in FIG. 4, each data group is, for instance, as shown in FIG. 5 in which required numbers of correction pulses are stored corresponding to the sections $l_1$ to $l_n$, respectively. Incidentally, in the case where the quantity of backlash almost remains unchanged in the section of movement, it is sufficient to store only one amount of backlash for each of the backlash correction data groups $BD_1$ to $BD_n$ and, in such a case, the backlash correction data groups $BD_1$ to $BD_n$ are such as shown in FIG. 6 in which one kind of correction pulse number is stored corresponding to each state.

The correction data selecting circuit MPX selects from the pitch error correction data groups $PD_1$ to $PD_n$ and the backlash correction data groups $BD_1$ to $BD_n$ a pitch error correction data group and a backlash correction data group corresponding to the state of the machine tool at the time of correction. This selection is carried out based on the status signal $cd_1$ indicating, for instance, the temperature of the ball screw, and the status signal $cd_2$ indicating, for instance, the weight of the workpiece. The status signals $cd_1$ and $cd_2$ may also be outputs from a temperature detector and a weight detector, respectively, or input signals from the command tape or an control panel.

Now, in FIG. 1, the command tape PT is read out by known readout means and, a movement command value and movement direction command information are provided to the interpolator INT, from which command pulses are applied via the OR gates $OG_1$ and $OG_2$ and the gate circuit GAT to the error register ERR.

Depending on the output from the drive circuit SA, the servomotor SM is driven and the movable machine part MP is moved by the ball screw DS. The rotation of the ball screw DS is detected by the detector DET and its detection pulses are fed to the direction deciding circuit DDM, wherein the direction of feed of the ball screw DS is decided by known means, and the decided output is provided via the gate circuit GAT to the error register ERR. The servomotor SM is then driven until the content of the error register ERR is reduced to zero.

The position counter CONT indicates the position of the movable machine part MP by accumulating command pulses, and the direction reversal decision circuit DDC detects the reversal of the direction of feed. The position information and the reversal information are provided to the position correcting circuit CPG. When the movable machine part is moved to the pitch error correcting points $P_1$ to $P_8$, the position correcting circuit CPG applies, by using the pitch error correction data group selected by the correction data selecting circuit MPX, correction pulses corresponding to the correcting points via the OR gates $OG_1$ and $OG_2$ and the gate circuit GAT to the error register ERR to perform a pitch error correction, and when the direction of feed is reversed, the position correcting circuit applies, by using the backlash correction data group selected by the correction data selecting circuit MPX, correction pulses for backlash correction to the error register ERR via the OR gates $OG_1$ and $OG_2$ and the gate circuit GAT, effecting a backlash correction.

By using the equipment of the present invention in such a manner, a correction can be achieved corresponding to the state of the numerical control machine tool for each correction and, consequently, even if the pitch error or the amount of backlash varies with variations in temperature of the screw and the weight of the workpiece, an accurate correction can be carried out at all times.

While in the foregoing embodiment error correction is performed by adding a correction pulse to a command pulse, it is also possible to adopt such an arrangement that the correction pulse is added to a feedback pulse from the detector DET. Further, although the embodiment has been described in connection with the case where the present invention is applied to the correction of both of the pitch error and the backlash error, it is optional to apply the present invention to either one of them. Moreover, the method of storing the error correction data and the error correcting method are not limited specifically to those in the foregoing embodiment but may also be various other methods heretofore employed.

As has been described in the foregoing, according to the present invention, error correction data predetermined by measurement in various states of a numerical control machine tool are stored in an error storage circuit corresponding to the respective states and, for actual correction, the error correction data corresponding to a particular state of the numerical control machine tool is used, thus permitting an optimum correction at all times; therefore, the present invention possesses the advantage that highly accurate position control can be achieved. Accordingly, the present invention, when employed in the numerical control machine tool, improves the tool performance, and hence is of great utility.

We claim:

1. Position error correction equipment for correcting an error in the position of movement relative to a commanded position in a numerical control machine tool, comprising:
    an error storage circuit in which error correction data groups, where each group is predetermined by measurement in respective states of the numerical control machine tool, are stored corresponding to the respective states, each group containing plural correction values where each value corresponds to a different position or range of positions;
    an error correction data selecting circuit, operatively connected to said error storage circuit, for selecting one of the error correction data groups corresponding to the particular state of the numerical control machine tool from the error correction data groups stored in the error storage circuit; and
    a position correcting circuit, operatively connected to said error correction data selecting circuit and the numerical control machine tool, for correcting the error in the position of movement in dependence upon the correction values associated with the position in the error correction data group selected by the error correction data selecting circuit.

2. Position error correction equipment as recited in claim 1, wherein the error correction data groups include pitch error correction data groups and backlash error correction data groups.

3. Position error correcting equipment as recited in claim 1, wherein each group corresponds to a different temperature of a ball screw.

4. Position error correcting equipment as recited in claim 1, wherein each group corresponds to a different weight for a workpiece.

* * * * *

UNITED STATES PATENT AND TRADEMARK OFFICE
CERTIFICATE OF CORRECTION

PATENT NO. : 4,502,108

DATED : Feb. 26, 1985

INVENTOR(S) : Ryoichiro Nozawa et al

It is certified that error appears in the above-identified patent and that said Letters Patent is hereby corrected as shown below:

Column 1, line 32, "come-" should be --some--.

Column 2, line 38, "$l_1$ to $l_n$" should be --$\ell_1$ to $\ell_n$--;

line 41, "$l_1$" should be --$\ell_1$--;

line 42 "$l_n$" should be --$\ell_n$--;

line 62, "an" should be --a--;

line 64, "and," should be --and--.

Signed and Sealed this

Seventeenth Day of September 1985

[SEAL]

Attest:

Attesting Officer

DONALD J. QUIGG

Commissioner of Patents and Trademarks—Designate